United States Patent [19]

Shelly et al.

[11] Patent Number: 4,656,151
[45] Date of Patent: Apr. 7, 1987

[54] INTERMETALLIC COMPOUND

[75] Inventors: Javan Shelly, Cincinnati; Louis J. Rekers, Wyoming, both of Ohio

[73] Assignee: National Distillers and Chemical Corporation, New York, N.Y.

[21] Appl. No.: 754,885

[22] Filed: Jul. 15, 1985

[51] Int. Cl.$^4$ ................................................ C08F 4/64
[52] U.S. Cl. .................................... 502/113; 502/116; 502/119; 502/117; 502/125; 526/114; 526/116; 526/128
[58] Field of Search ............... 502/113, 119, 116, 117, 502/125

[56] References Cited

U.S. PATENT DOCUMENTS

| | | | |
|---|---|---|---|
| 3,135,809 | 6/1964 | Bosmajian | 502/103 X |
| 4,365,048 | 12/1982 | Ueno et al. | 502/125 X |
| 4,451,688 | 5/1984 | Kuroda et al. | 502/125 X |
| 4,513,095 | 4/1985 | Speca | 502/119 X |
| 4,536,487 | 8/1985 | Speca | 502/119 |
| 4,540,680 | 9/1985 | Speca | 502/119 |

*Primary Examiner*—Patrick P. Garvin
*Attorney, Agent, or Firm*—Kenneth D. Tremain

[57] ABSTRACT

An intermetallic compound is disclosed formed by
(a) mixing a compound having the structural formula R(R')Mg where R and R' are the same or different and are hydrocarbyl of 1 to 10 carbon atoms with a compound having the structural formula $R^1_mSi(OR^2)_nX_{4-(m+n)}$ where $R^1$ and $R^2$ are the same or different and are alkyl having from 1 to 10 carbon atoms, phenyl, alkaryl having from 7 to 10 carbon atoms or alkenyl having from 2 to 10 carbon atoms; X is halogen; n is an integer of 1 to 4; and m is 0 or an integer of 1 to 3, wherein a product is formed;
(b) mixing the product of step (a) with an organometallic compound, the metal of said organometallic compound being a metal of Group IVb of Vb of the Periodic Table of the Elements, wherein a product is formed; and
(c) reacting the product of step (b) with an organometallic compound, said organometallic compound containing at least one halogen atom, said metal in said organometallic compound selected from the group consisting of zirconium, vanadium, boron, silicon, titanium and aluminum. A catalyst system comprising the intermetallic compound and an organometallic compound is also taught. In addition, a process for polymerizing at least one alpha-olefin in the presence of a catalytically effective amount of said catalyst system is set forth.

11 Claims, No Drawings

4,656,151

INTERMETALLIC COMPOUND

BACKGROUND OF THE INVENTION

1. Field of the Invention

The present invention is directed to an intermetallic compound. More specifically, the instant invention is directed to a new intermetallic compound useful in the catalytic polymerization of alpha-olefins.

2. Background of the Prior Art

The ever increasing body of technical literature, especially patents, directed to catalysts useful in the polymerization of unsaturated monomers in general and alpha-olefins in particular evidences the tremendous interest and importance of this technology. Much work has been devoted to the development of new catalysts which comprise a transition metal such as titanium, vanadium, zirconium or the like in combination with a metal such as magnesium, manganese and the like. As those skilled in the art are aware, utilization of this type of catalyst in combination with an organometallic compound, the metal of which is preferably aluminum, is utilized as a catalyst system in the polymerization of alpha-olefins.

The voluminous nature of the prior art directed to this technology makes it impossible to fully summarize the scope of just recent developments. Thus, only the most relevant prior art is included in the following discussion of catalysts and methods of forming catalysts useful in the polymerization of ethylenically unsaturated monomers.

Of particular interest is U.S. Pat. No. 4,451,688 which discloses a process for preparing a polyolefin in presence of a catalyst, the catalyst comprising the combination of (I) a solid substance obtained by reacting (i) at least one magnesium compound represented by the general formula $R^1_m(OR^2)_n MgX_{2-(m+n)}$ wherein $R^1$ and $R^2$ are each a hydrocarbon radical having 1 to 24 carbon atoms; X is halogen; m is 0 to 2; n is 0 to 2 provided that the sum of m and n is between 0 and 2 with (ii) a titanium and/or vanadium compound; (II) a silicon compound having the general formula $R'_m Si(OR'')_n X_{4-(m+n)}$ wherein $R'$ and $R''$ are each hydrocarbon radicals having 1 to 24 carbon atoms; X is a halogen; m is 0 to 4; n is greater than 0 but not more than 4 with the proviso that the sum of m and n is greater than 0 but not more than 4; and (III) an organometallic compound. The '688 patent includes the further limitation that the silicon compound (II) be pre-reacted with the organometallic compound (III).

Another recent disclosure of a process for polymerizing an alpha-olefin, embodied in U.S. Pat. No. 4,365,048, utilizes a catalyst comprising a Grignard compound of the formula $R^3 MgX$, wherein $R^3$ is an alkyl having 1 to 8 carbon atoms; and X is a halogen, is reacted with the reaction product of an aluminum halide with an organic silicon compound of the formula $R^1_n Si(OR^2)_{4-n}$, wherein $R^1$ is an alkyl having 1 to 8 carbon atoms or phenyl; $R^2$ is an alkyl of 1 to 8 carbon atoms; and n is 1, 2 or 3. The resultant solid reaction product is contacted with titanium tetrahalide. The resulting titanium-containing solid product is treated with an organic acid ester and, finally, the so-treated solid product is contacted with a titanium tetrahalide. The catalyst system not only includes the product of the above-mentioned steps but, in addition, the reaction product includes a trialkylaluminum compound where the alkyl is one of 2 to 6 carbon atoms.

Yet another recent teaching is U.S. Pat. No. 4,374,753. This patent discloses a catalyst and a method in which the catalyst is used in association with an aluminum cocatalyst in the polymerization and copolymerization of alpha-olefins. The catalyst of this patent is prepared by reacting an organic silicon compound with silica and/or alumina having surface hydroxyl groups. The silicon compound reacts with the hydroxyl groups. The product of this reaction is, in turn, reacted with an organometallic compound wherein the metal thereof is one of Group IIb of the Periodic Table, preferably an organomagnesium compound. The product of this reaction is then reacted with an alcohol. Finally, this reaction product is reacted with a halide or alkoxide of titanium, vanadium, zirconium or mixtures thereof.

Although these recent disclosures advance the art, there is still a growing need for new improved catalysts in the polymerization of alpha-olefins in general and ethylene homopolymers and copolymers in particular. Specifically, there is a continuing need to prepare polymers having narrower molecular weight distribution with reduced amounts of low molecular weight polymer than those presently known in the art.

BRIEF SUMMARY OF THE INVENTION

The present invention is directed to a new intermetallic compound, a new catalyst system utilizing this new intermetallic compound and a new polymerization process utilizing this new catalyst system which results in the formation of a poly(alpha-olefin) from the corresponding alpha-olefin monomer which is characterized by a narrower molecular weight distribution compared to the poly(alpha-olefins) of the prior art. These poly(alpha-olefins) are further characterized by reduced levels of low molecular weight polymer.

In accordance with the instant invention an intermetallic compound is disclosed which is the product resulting from (a) combining a compound having the structural formula R(R')Mg where R and R' are the same or different and are hydrocarbyl having 1 to 10 carbon atoms, with a compound having the structural formula $R^1_m Si(OR^2)_n X_{4-(m+n)}$ where $R^1$ and $R^2$ are the same or different and are alkyl having from 1 to 10 carbon atoms, phenyl, alkaryl having from 7 to 10 carbon atoms or alkenyl having from 2 to 10 carbon atoms; X is halogen; n is an integer of 1 to 4; and m is 0 or an integer of 1 to 3;

(b) combining the mixture product of step (a) with a metal-containing compound wherein the metal of said metal-containing compound is a metal of Group IVb or Vb of the Periodic Table of the Elements; and (c) reacting a compound containing at least one halogen atom, and an atom selected from the group consisting of silicon, boron, zirconium, vanadium, aluminum and titanium with the mixture product of step (b).

In further accordance with the present invention a catalyst system is provided. This system comprises:

(I) an intermetallic compound formed by (a) combining a compound having the structural formula R(R')Mg where R and R' are the same or different and are hydrocarbyl having up to 1 to 10 carbon atoms and a compound having the structural formula $R^1_m Si(OR^2)_n X_{4-(m+n)}$, where $R^1$ and $R^2$ are the same or different and are alkyl having from 1 to 10 carbon atoms, phenyl, alkaryl having from 7 to 10 carbon atoms or alkenyl having from 2 to 10 carbon atoms; X is halogen; n is an integer of 1 to 4; and m is 0 or an integer of 1 to 3;

(b) combining the mixture product of step (a) and a metal-containing compound where the metal of said metal-containing compound is a metal of Group IVb or Vb of the Periodic Table of the Elements; and (c) reacting a compound containing at least one halogen atom, and an atom selected from the group consisting of silicon, boron, zirconium, vanadium, aluminum and titanium with the mixture product of step (b) and (II) an organoaluminum compound.

In still further accordance with the present invention a process for the polymerization of alpha-olefins is set forth. In this process at least one alpha-olefin is polymerized in the presence of a catalytically effective amount of a catalyst system comprising (I) an intermetallic compound formed by (a) combining a compound having the structural formula $R(R^1)Mg$ where R and R' are the same or different and are hydrocarbyl having 1 to 10 carbon atoms, and a compound having the structural formula $R^1{}_mSi(OR^2)_nX_{4-(m+n)}$ where $R^1$ and $R^2$ are the same or different and are alkyl having from 1 to 10 carbon atoms, phenyl, alkaryl having from 7 to 10 carbon atoms or alkenyl having from 2 to 10 carbon atoms; X is halogen; n is an integer of 1 to 4; and m is 0 or an integer of 1 to 3;

(b) combining the mixture product of step (a) and a metal-containing compound where the metal of said metal-containing compound is a metal of Group IVb or Vb of the Periodic Table of the Elements; and (c) reacting a compound containing at least one halogen atom and an atom selected from the group consisting of silicon, boron, zirconium, vanadium, aluminum and titanium with the mixture product of step (b) and (II) an organoaluminum compound.

DETAILED DESCRIPTION

The present invention is directed to an intermetallic compound which is formed by (a) combining a compound having the structural formula $$R(R')Mg \quad (I)$$

where R and R' are the same or different and are hydrocarbyl of 1 to 10 carbon atoms with a compound having the structural formula $$R^1{}_mSi(OR^2)_nX_{4-(m+n)} \quad (II)$$

where $R^1$ and $R^2$ are the same or different and are alkyl having from 1 to 10 carbon atoms, phenyl, alkaryl having from 7 to 10 carbon atoms or alkenyl having from 2 to 10 carbon atoms; X is halogen; n is an integer of 1 to 4; and m is 0 or an integer of 1 to 3.

More preferably, R and R' of structural formula (I) are the same or different and are alkyl of 3 to 8 carbon atoms. The compound whose structural formula is (II) is more preferably defined by $R^1$ and $R^2$ being the same or different and being alkyl of 2 to 8 carbon atoms, phenyl, alkaryl of 7 to 10 carbon atoms or alkenyl of 2 to 6 carbon atoms; n is an integer of 1 to 4; n is 0 or an integer of 1 to 3; and X is chlorine.

Still more preferably, R and R' of formula (I) are the same or different and are alkyl of 4 to 6 carbon atoms. In this still more preferred embodiment, $R^1$ and $R^2$ of formula (II) are the same or different and are alkyl of 2 to 6 carbon atoms, phenyl or alkenyl of 2 to 4 carbon atoms; n is an integer of 1 to 4; m is 0 or an integer of 1 to 3; and X is chlorine.

Yet still more preferably, R and R' of compound (I) are the same and are alkyl of 4 to 6 carbon atoms and $R^2$ of compound II is an alkyl of 2 to 4 carbon atoms; m is 0 and n is 4.

The product mixture of step (a), involving contact between the compound whose structural formula is (I) and the compound whose structural formula is (II), is in turn, in step (b), mixed with a metal-containing compound wherein the metal of said metal-containing compound is a metal of Group IVb or Vb of the Periodic Table of the Elements.

Preferably, the metal-containing compound containing a Group IVb or Vb metal mixed with the product of step (a) is a compound having structural formula $$M(R^5)_{p-r}X_r \quad (III)$$

where M is a metal of Group IVb or Vb of the Periodic Table; X is halogen; p is an integer equal to the valence of M; r is 0 or an integer of 1 to p; $R^5$ is representative of p−r groups which may be the same or different and are alkyl or alkoxy of 1 to 10 carbon atoms; and X is halogen.

Alternately, the metal-containing compound mixed with the product of step (a) is a compound having the structural formula $$M(R^5)_{p-2}O \quad (IV)$$

where M, $R^5$, representative of p−2 groups, and p have the meanings given for the compound of formula (III).

More preferably, the metal-containing compound having the structural formula (III) or (IV), mixed with the product of step (a), is characterized by M being titanium, vanadium or zirconium; p being an integer equal to the valence of M; r, in the case of compound (III), being 0 or an integer between 1 and p−1; $R^5$ being representative of p−r or p−2 groups in the case of compound (III) or (IV), respectively, which may be the same or different and are alkoxy of 1 to 10 carbon atoms; and X being chlorine.

Still more preferably, the metal-containing compound, mixed with the product of step (a), has the structural formula (III) where M is titanium; p is an integer equal to the valence of M; r is 0; and $R^5$, representative of m groups, is the same or different and is alkoxy of 2 to 6 carbon atoms.

Most preferably, the metal-containing compound has the structural formula (III) and is characterized by M being titanium; p being 4; and r being 0; and $R^5$ representing 4 groups which are the same and are alkoxy of 3 to 5 carbon atoms.

The product of step (b) is, in step (c), reacted with a halogenated compound to produce the intermetallic compound of the present invention. In this step the product of step (b) is reacted with a compound containing at least one halogen atom. The compound also includes a compound selected from the group consisting of zirconium, vanadium, boron, silicon, titanium and aluminum.

More preferably, the compound, reacted with the product of step (b), comprises one atom of a metal selected from the group consisting of zirconium, vanadium, boron, silicon, titanium and aluminum and a number of atoms of chlorine equal to the valence of the metal.

Still more preferably, the compound, reacted with the product of step (b) is silicon tetrachloride or titanium tetrachloride.

Most preferably, the compound, reacted with the product of step (b), is silicon tetrachloride.

The above described intermetallic compound may be prepared in an inert solvent. Suitable solvents include aliphatic or aromatic hydrocarbons such as pentane, hexane, heptane, cyclohexane, benzene, toluene, xylene and the like.

The magnesium containing compound having the structural formula (I) is mixed with the compound having the structural formula (II) at a temperature in the range of between 0° and 150° C., preferably between 20° and 100° C., at a molar ratio of compound (I) to compound (II) in the range of between 10:1 and 1:10, to form the product of step (a). The step (a) product is then reacted with an organometallic compound wherein the metal of Group IVb or Vb of the Periodic Table of the Elements at a temperature of 0° to 200° C., preferably 20° to 150° C., and at a molar ratio of magnesium compound to Group IVb or Vb metal in the range of between of 10:1 and 1:10 to form product (b).

Product (b) is then mixed with a compound containing at least one halogen atom, and an atom of zirconium, vanadium, boron, silicon, titanium or aluminum, initially at a temperature in the range of between −20° and 100° C., preferably between 0° and 60° C. and, subsequently, at a temperature in the range of between 0° and 200° C., preferably, between 20° and 150° C. at a molar ratio of compound (I) to halogen-containing organometallic compound in the range of between 1:1 and 1:20.

The present invention is also directed to a catalyst system comprising the intermetallic compound formed in accordance with the procedure enumerated above in combination with a cocatalyst, an organometallic compound. More preferably, the cocatalyst is an organoaluminum compound. That is, the metal of the organometallic compound is aluminum. Still more preferably, the organometallic compound is aluminum trialkyl where the alkyl is one having 1 to 6 carbon atoms. Most preferably, the organoaluminum compound is aluminum trialkyl where the alkyl of the trialkyl is one of 2 to 4 carbon atoms.

In a preferred embodiment of the catalyst system of this invention the cocatalyst is totally independent of the intermetallic compound. That is, the organometallic cocatalyst is not prereacted with the intermetallic compound prior to the complete formation of the intermetallic compound. Neither is any component involved in the formation of the intermetallic compound prereacted with the organometallic cocatalyst.

The instant invention furthermore includes a process involving the polymerization of alpha-olefins. In this process a catalytically effective amount of the catalyst system of the present invention is provided in the polymerization of alpha-olefins. Preferably, the alpha-olefin polymerized comprises ethylene. That is, in a preferred embodiment, the process is directed to the homopolymerization of ethylene or the copolymerization of ethylene with one or more alpha-olefins other than ethylene.

In the event the process involves the copolymerization of ethylene, it is preferred that the additional alpha-olefin or alpha-olefins contain 3 to 10 carbon atoms. Among the alpha-olefins having 3 to 10 carbon atoms preferred for copolymerization with ethylene in the present invention are propylene, 1-butene, 1-pentene, 3-methyl-1-butene, 1-hexene, 4-methyl-1-pentene, 3-methyl-1-pentene, 1-heptene, 1-octene, 1-nonene and 1-decene. Of the alpha-olefins copolymerized with ethylene those containing 4 to 6 carbon atoms are most preferred. In this most preferred embodiment, butene-1 and hexene-1 are the preferred alpha-olefins copolymerized with ethylene.

The process of the present invention, involving the formation of poly(alpha-olefins), is preferably conducted in a gas-phase reactor or a loop reactor adapted for slurry polymerization. In the preferred embodiment wherein slurry polymerization is utilized the suspending agent is preferably an inert hydrocarbon such as isobutane, pentane, isopentane, hexane, heptane, cyclohexane or the like.

The polymerization process of the present invention is conducted at a pressure in the range of between 200 and 40,000 pounds per square inch (psi). Preferably, the polymerization pressure is in the range of between 200 and 5,000 psi and most preferably, between 200 and 1,000 psi. The temperature of the polymerization process is preferably in the range of between 100° and 200° F. In addition to the alpha-olefin reactant or reactants, hydrogen gas is preferably introduced in the polymerization reactant in suitable concentration to control molecular weight distribution of the poly(alpha-olefin) or poly(alpha-olefins) formed.

The following examples illustrate the scope and spirit of the present invention. Because these examples are given for illustrative purposes only, the invention embodied therein should not be limited thereto.

EXAMPLE 1

Preparation of the Intermetallic Compound

Thirty ml of 1.1 M sec-butyl-n-butylmagnesium (0.0350 mole) was dissolved in 100 ml hexane. The resultant solution was placed in a 500 ml, 3-necked flask equipped with a condenser, a 60 ml addition funnel and a mechanical stirrer. An equimolar amount, 0.0350 mole, of tetraethoxysilane, a liquid, 7.8 ml (7.3 g) was dissolved in 15 ml of hexane. This tetraethoxysilane solution was added to the organomagnesium compound in the three-necked flask. The flask was warmed slightly to produce a flocculent, white precipitate. To this mixture was added 24 ml (24 g) of the liquid tetrabutyltitanate, representing 0.070 mole. The introduction of the titanate yielded a dark, blue-green solution. Silicon tetrachloride, in an amount of 32 ml (47.6 g), equivalent to 0.280 mole, was dissolved in 20 ml hexane and added to the blue-green solution. The introduction of the silicon tetrachloride effected an exothermic reaction with the concurrent formation of a reddish-brown solid. The flask at this point was warmed slowly to reflux. Reflux was maintained for 2 hours. The reaction product was then cooled, the liquid decanted and the solid washed six times using 100 ml hexane each time. Thereafter, the product was washed two more times using 150 ml of hexane in each washing. The solid product of this reaction was then dried by disposing the solid product in a rotary evaporator. The final product was 6.55 g of a lumpy solid.

EXAMPLE 2

Preparation of the Intermetallic Compound

Thirty ml of a heptane solution of sec-butyl-n-butyl-magnesium (1.1 M) dissolved in 100 ml hexane was added to a flask, followed by the addition of an equimolar amount, 7.8 ml, of tetraethoxysilane. The flask was warmed slightly then allowed to cool to room temperature. Twenty-four ml of titanium tetrabutylate and 32 ml of silicon tetrachloride were added, and the mixture was heated at reflux temperature for two hours. The reaction product was cooled, the supernatant decanted, and the solid was washed eight times with hexane. The solid was then dried under vacuum to give 6.6 grams of the intermetallic compound.

EXAMPLE 3

Preparation of the Intermetallic Compound

The procedure of Example 2 was repeated but for the substitution of 12.7 ml of triethoxyphenylsilane for the 7.8 ml of tetraethoxysilane. The yield of intermetallic compound obtained was 8.9 grams.

EXAMPLE 4

Preparation of the Intermetallic Compound

Fifty-one ml of a heptane solution comprising sec-butyl-n-butylmagnesium (0.68 M) and 75 ml of hexane was added to a flask, followed by the addition of 7.8 ml of tetraethoxysilane and 24 ml of titanium tetrabutylate. The contents of the flask were heated for 30 minutes at reflux temperature, then cooled in an ice bath. Twenty-four ml of silicon tetrachloride were added and the mixture stirred for another hour. After 1½ hours at room temperature, the mixture was heated again at reflux temperature for two hours. The supernatant was decanted, the remaining solid was washed five times with hexane, and the solid product dried under vacuum to give 9.4 grams of an intermetallic compound.

EXAMPLE 5

Polymerization of Ethylene and Butene-1 Using the Catalyst System

The intermetallic compound of Example 1 (0.003 grams) and 1 cc of a 25 weight percent solution of triethylaluminum in heptane were added to a one gallon reactor along with 1200 cc of isobutane. A preload of 190 cc of butene-1 was added, the reactor contents were brought to a temperature of 170° F. and 51 psi of hydrogen added. Ethylene was added to the reactor to maintain a total pressure of 350 psig and butene-1 was fed to the reactor at a rate of 7.6 cc/min. After one hour, the reactor was vented and 162 grams of a copolymer of ethylene and butene-1 having a density of 0.918 g/cc was obtained. The melt index determined in accordance with ASTM D1238 (2.16 Kg), was 1.44, and the high load melt index to melt index ratio ($I_{21.6kg}/I_{2.16kg}$) was 29.3.

EXAMPLE 6

Polymerization of Ethylene and Butene-1 Using the Catalyst System

The intermetallic compound of Example 2 (0.003 gram) was used with 1 cc of a 25 wt % solution of triethylaluminum for the copolymerization of ethylene and butene-1 in a manner analogous to Example 5, using 114 cc of butene-1 as preload, 46 psi of hydrogen and 345 psig total pressure. Four hundred fifty grams of an ethylene-butene copolymer having a density of 0.919 g/cc was obtained in this polymerization reaction. The melt index was 1.30 (in accordance with ASTM D-1238) and the high load melt index to melt index ratio ($I_{21.6}/I_{2.16}$) was 30.0.

The above preferred embodiments and examples are given to illustrate the scope and spirit of the instant invention. These embodiments and examples will make apparent, to those skilled in the art, other embodiments and examples. These other embodiments and examples are within the contemplation of the present invention. Therefore, the present invention should be limited only by the appended claims.

What is claimed is:

1. An intermetallic compound formed by
   (a) mixing a compund having the structural formula R(R')Mg, where R and R' are the same or different and are hydrocarbyl of 1 to 10 carbon atoms, with a compound having the structural formula $R^1{}_mSi(OR^2)_nX_{4-(m+n)}$ where $R^1$ and $R^2$ are the same or different and are alkyl having 1 to 10 carbon atoms, phenyl, alkaryl having from 7 to 10 carbon atoms or alkenyl having from 2 to 10 carbon atoms; X is halogen; n is an integer of 1 to 4; and m is 0 or an integer of 1 to 3, wherein a product is formed;
   (b) mixing the product of step (a) with a metal-containing compound, the metal of said metal-containing compound being a metal of Group IVb or Vb of the Periodic Table of the Elements, wherein a product is formed; and
   (c) reacting the product of step (b) with a compound, said compound containing at least one halogen atom and an atom selected from the group consisting of zirconium, vanadium, boron, silicon, titanium and aluminum, whereby an intermetallic compound is formed.

2. A compound in accordance with claim 1 wherein R and R' are the same or different and are alkyl of 3 to 8 carbon atoms; $R^1$ and $R^2$ the same or different and are alkyl having from 2 to 8 carbon atoms, phenyl, alkaryl having from 7 to 10 carbon atoms or alkenyl having from 2 to 6 carbon atoms; X is chlorine; said metal-containing compound containing a metal of Group IVb or Vb has a structural formula selected from the group consisting of $M(R^5)_{p-r}X_r$ and $M(R^5)_{p-2}O$, where M is a metal of Group IVb or Vb; p is an integer equal to the valence of M; r is 0 or an integer between 1 and p; $R^5$ is representative of p−r groups or p−2 groups which may be the same or different and are alkyl or alkoxy of 1 to 10 carbon atoms; and X is halogen; and said compound, reacted with the product of step (b), comprises one atom of a metal selected from the group consisting of zirconium, vanadium, boron, silicon, titanium and aluminum and a number of atoms of chlorine equal to the valence of the metal in said organometallic compound.

3. A compound in accordance with claim 2 wherein R and R' are the same or different and are alkyl of 4 to 6 carbon atoms; $R^1$ and $R^2$ are the same or different and are alkyl of 2 to 6 carbon atoms, phenyl or alkenyl of 2 to 4 carbon atoms; M is titanium, vanadium or zirconium; r is 0 or an integer between 1 and p−1; X is chlorine; and $R^5$ is representative of p−r or p−2 groups which may be the same or different and are alkoxy of 1 to 10 carbon atoms; and said compound, reacted with the product of step (b), is selected from the group consisting of silicon tetrachloride and titanium tetrachloride.

4. A compound in accordance with claim 3 wherein R and R' are the same and are alkyl of 4 to 6 carbon atoms; $R^2$ is alkyl of 2 to 4 carbon atoms; m is 0; and n is 4; said organometallic compound containing a metal of Group IVb or Vb has the structural formula $M(R^5)_{p-r}X_r$ where M is titanium; r is 0; p is 4 and $R^5$ is representative of 4 groups which may be the same or different and are alkoxy of 2 to 6 carbon atoms; and said compound, reacted with the product of step (b), is silicon tetrachloride.

5. A compound in accordance with claim 4 wherein $R^5$ is representative of p groups which are the same and are alkoxy of 3 to 5 carbon atoms.

6. A catalyst system comprising:
(A) an intermetallic compound formed by
  (a) mixing a compound having the structural formula R(R')Mg, where R and R' are the same or different and are hydrocarbyl of 1 to 10 carbon atoms with a compound having the structural formula $R^1_m Si(OR^2)_n X_{4-(m+n)}$ where $R^1$ and $R^2$ are the same of different and are alkyl having from 1 to 10 carbon atoms, phenyl, alkaryl having from 7 to 10 carbon atoms or alkenyl having from 2 to 10 carbon atoms; X is halogen; n is an integer of 1 to 4; and m is 0 or an integer of 1 to 3, wherein a product is formed;
  (b) mixing the product of step (a) with a metal-containing compound, the metal of said metal-containing compound being a metal of Group IVb or Vb of the Periodic Table of the Elements, wherein a product is formed; and
  (c) reacting the product of step (b) with a compound, said compound containing at least one halogen atom and an atom selected from the group consisting of zirconium, vanadium, boron, silicon, titanium and aluminum, whereby an intermetallic compound is formed; and
(B) an organometallic compound.

7. A catalyst system in accordance with claim 6 wherein said intermetallic compound (A) is characterized by R and R' being the same of different and being alkyl of 3 to 8 carbon atoms; $R^1$ and $R^2$ are the same or different and are alkyl having from 1 to 10 carbon atoms, phenyl, alkaryl having from 2 to 8 carbon atoms or alkenyl having from 2 to 6 carbon atoms; and X is chorine; said metal-containing compound containing a metal of Group IVb or Vb having a structural formula selected from the group consisting of $M(R^5)_{p-r}X_r$ and $M(R^5)_{p-2}O$, where M is a metal of Group IVb or Vb; p being an integer equal to the valence of M; n being 0 or an integer between 1 and p; $R^5$ is representative of p−r groups which may be the same or different are alkyl or alkoxy of 1 to 10 carbon atoms; and X is halogen; and said compound, reacted with the product of step (b), comprising one atom of a metal selected from the group consisting of zirconium, vanadium, boron, silicon, titanium and aluminum and a number of atoms of chlorine equal to the valence of the metal in said compound; and wherein said organometallic compound (B) is an organoaluminum compound.

8. A catalyst system in accordance with claim 7 wherein said intermetallic compound (A) is characterized by R and R' being the same or different and being alkyl of 4 to 6 carbon atoms; $R^1$ and $R^2$ being the same or different and being alkyl of 2 to 8 carbon atoms, phenyl or alkenyl of 2 to 4 carbon atoms; said metal-containing compound containing a metal of Group IVb or Vb has the formula $M(R^5)_{p-r}X_r$ where M is titanium, vanadium or zirconium; r is 0 or an integer between 1 and p−1; X is chlorine; and $R^5$ being representative of p−r groups which may be the same or different and being alkoxy of 1 to 10 carbon atoms; and said compound, reacted with the product of step (b), being selected from the group consisting of silicon tetrachloride and titanium tetrachloride; and wherein said organoaluminum compound (B) is aluminum trialkyl; where said alkyl of said trialkyl contains 1 to 6 carbon atoms.

9. A catalyst system in accordance with claim 8 wherein R and R' are the same and are alkyl of 4 to 6 carbon atoms; $R^2$ is alkyl of 2 to 4 carbon atoms; M is titanium; r being 0; and $R^5$ is representative of 4 groups which may be the same or different and are alkoxy of 2 to 6 carbon atoms; said compound, reacted with the product of step (b), is silicon tetrachloride; and wherein said alkyl of said aluminum trialkyl wherein said alkyl of said trialkyl contains 2 to 4 carbon atoms.

10. A catalyst system in accordance with claim 9 wherein $R^5$ is representative of p groups which are the same and are alkoxy of 3 to 5 carbon atoms.

11. A catalyst system in accordance with claim 6 wherein said intermetallic compound (A) or any component thereof are not prereacted with said organometallic compound (B).

* * * * *